United States Patent [19]

Chang

[11] 4,323,930
[45] Apr. 6, 1982

[54] SLOW MOVING VIDEO TAPE REPRODUCTION

[75] Inventor: David T. L. Chang, Palo Alto, Calif.

[73] Assignee: Recortec, Inc., Mountain View, Calif.

[21] Appl. No.: 194,008

[22] Filed: Oct. 6, 1980

[51] Int. Cl.³ ............................................. H04N 5/78
[52] U.S. Cl. ...................................... 360/10; 360/33; 360/38; 358/127
[58] Field of Search ....................... 360/10, 33, 38, 70, 360/73, 64; 358/4, 8, 127, 172

[56] References Cited

U.S. PATENT DOCUMENTS

| | | | |
|---|---|---|---|
| 3,408,457 | 10/1968 | Boylan | 360/38 |
| 3,535,440 | 10/1970 | Watanabe | 360/70 |
| 3,662,101 | 5/1972 | Segerstrom | 360/38 |
| 3,787,615 | 1/1974 | Foester | 360/73 |
| 3,890,638 | 6/1975 | Bargen | 358/8 |
| 3,959,818 | 5/1976 | Iketaki | 360/14 |
| 4,044,389 | 8/1977 | Oldershaw | 360/73 |
| 4,214,259 | 7/1980 | Chang | 360/33 |

Primary Examiner—Bernard Konick
Assistant Examiner—Alan Faber
Attorney, Agent, or Firm—Thomas E. Schatzel

[57] ABSTRACT

A U-Matic video tape recorder of the type which is modified so as to employ wide-band-direct circuitry for developing a modulated signal from a video signal and to divide each frame of the modulated signal into several segments for recordation upon respective tracks of a tape is further modified to include circuitry for transporting the tape at a reduced rate wherein each segment of the modulated signal is multiply reproduced and circuitry for combining one of each multiply reproduced segments of a signal developed by a demodulator of the reproduced modulated signal with a black-level video signal to develop a signal representing in slow motion the original video signal.

11 Claims, 4 Drawing Figures

Fig_1

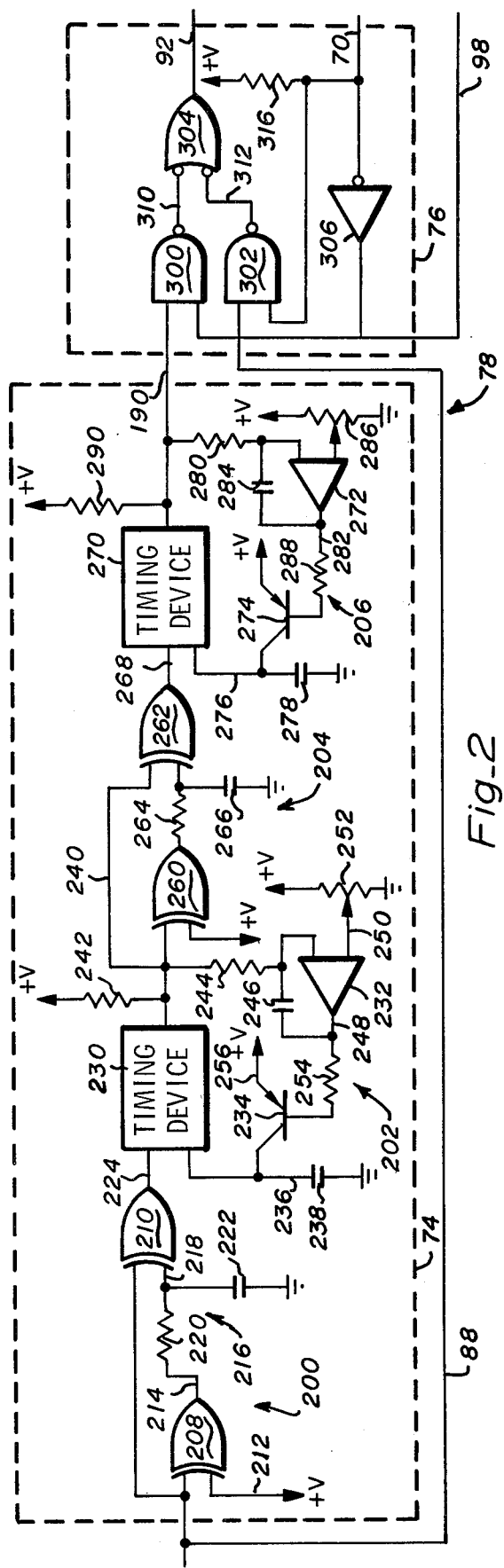
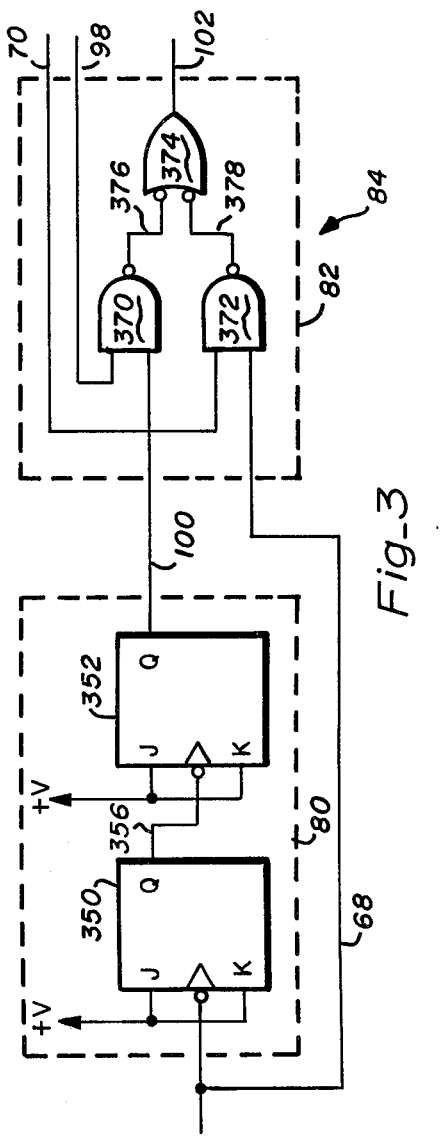
Fig.2
Fig.3

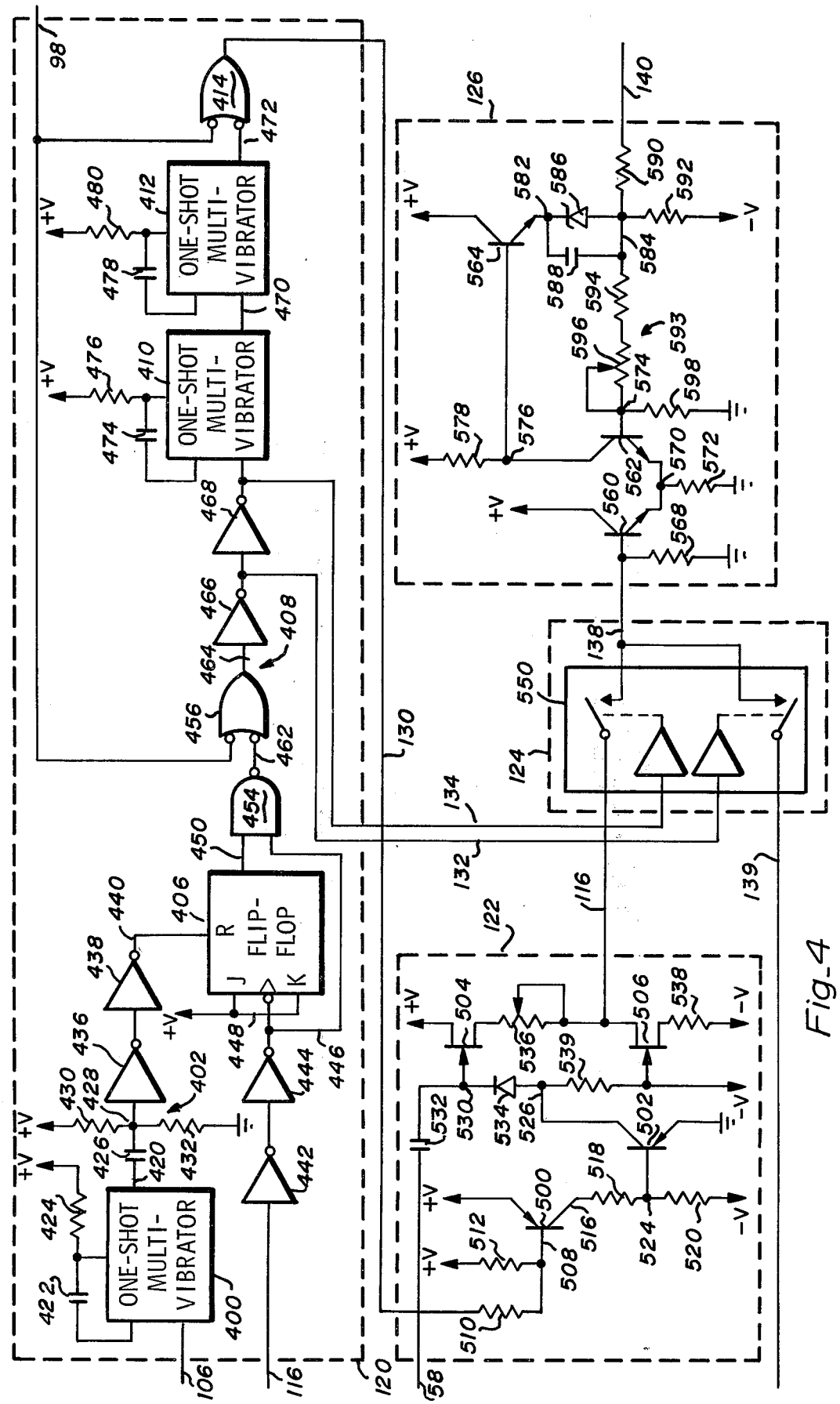
Fig._4

SLOW MOVING VIDEO TAPE REPRODUCTION

BACKGROUND OF THE INVENTION

1. Field of the Invention

The present invention relates generally to video-recorders/reproducers and more particularly to an improvement therein permitting the slow-motion reproduction of video tapes recorded in a segmented helical-scan format.

2. Description of the Prior Art

Although of broader application, the preferred embodiment of the present invention employs a prior art, EIAJ-2, U-Matic Video-Tape Recorder/Reproducer of the type which is designated 2860 by the Sony Corporation and which is modified according to the teachings of my now U.S. Pat. No. 4,214,259.

Unmodified, the above-mentioned prior-art recorder/reproducer has modulation circuitry of the type which is known as color-under for encoding for recording a video signal. This modulation circuitry develops a pair of signals by separating the luminance (black and white) and chrominance (color) portions of the video signal. The amplitude of the luminance signal is used to modulate the frequency of an oscillator to develop a frequency modulated signal which deviates from approximately 3.5 to 5.5 megahertz. The chrominance signal, which is in the form of double-sideband suppressed-carrier modulation of a 3.58 megahertz carrier, is mixed with a suitable frequency local oscillator signal to translate the frequency of the chrominance signal to a carrier frequency of 688 kilohertz. Finally, the translated signal is combined with the frequency modulated signal to develop a color-under signal suitably encoded for recordation by a scanner upon a length of three quarter inch wide magnetic recording tape.

The scanner is comprised of a pair of coaxially-disposed cylindrically-shaped drums including a lower, rigidly mounted drum for guiding the tape and a rotatable upper drum for carrying a pair of diametrically-opposed peripherally-mounted magnetic recording/reproducing heads driven by the color-under signal. Rotational drive for the upper drum is obtained from a motor which is so coupled to the upper drum by a pair of pulleys and a belt as to drive the drum at a rotational rate in excess of 1800 r.p.m.

The rotational rate of the upper drum is controlled by a servo loop that includes a drum-speed-sensing tachometer for developing a signal proportional to the rotational rate of the drum, a brake for slowing the drum and a drum-servo block. The drum-servo block responds to the frequency of the tachometer signal and to the frequency of the horizontal-synchronization portion of the video signal and develops a brake-driving signal for synchronizing the speed of the drum with the horizontal rate.

From a video cassette in which it is stored, a portion of the magnetic recording tape is drawn partially around the scanner by the combination of a capstan and pinch roller before being returned to the cassette. The tape wraps just over 180 degrees of the scanner in helical fashion such that as the scanner rotates, the drum carried heads define video paths, or tracks, which extend partially across a central portion of the tape at an acute angle with respect to the length thereof. With each revolution of the upper drum, synchronized by the drum servo loop, each of these heads records one field of the color under signal on a respective video track of the tape.

The capstan is driven by a capstan motor which forms a portion of a servo loop. The capstan servo loop synchronizes the speed of the capstan motor with the vertical synchronization portion of the video signal, which is also employed to develop a 30 hertz signal that is recorded by a control track recording/reproducing head upon a control track located along an edge of the tape.

The above-mentioned prior-art recorder/reproducer further includes demodulation circuitry for use in decoding signals reproduced from a previous recorded tape. A color-under signal reproduced by the heads of the scanner is frequency demodulated to develop a reproduced luminance signal and frequency translated to develop a reproduced chrominance signal. Finally, the demodulation circuitry combines the reproduced luminance and reproduced chrominance signals to develop a reproduced video signal.

Although satisfactory for many applications, the above-mentioned prior-art recorder/reproducer is not designed to record/reproduce video signals so as to meet broadcast quality standards. More specifically, the performance of this prior-art recorder/reproducer is indirectly limited by the relatively low drum-carried-recording/reproducing-head-to-tape velocity, referred to as video-recording velocity, which is employed. The low video-recording velocity limits the upper frequency range of signals which may be recorded upon the tape, including the frequency-modulation portion of the color-under signal. Further, the frequency range of the frequency-modulated portion of the color-under signal is limited by the frequency-modulation process. The frequency-modulation process produces sideband energy which extends above and below the oscillator frequency in proportion to the band width of the modulating video signal. Should this energy extend down into the upper band width of the modulating video signal, undesirable Moire distortion will occur. Thus, the video band width of the above-mentioned prior-art recorder/reproducer is suitably limited. Since the band width of the video signal is limited, not only to a frequency less than that required to meet broadcast quality standards, but to a frequency too low to preserve the chrominance portion of the video signal, the above-mentioned prior-art recorder/reproducer processes the chrominance portion of the video signal separately, as a color-under signal.

A disadvantage particularly associated with processing the chrominance portion separately is that the luminance and chrominance portions of the video signal are recorded using carrier signals which are widely separated in frequency. As a result, undesirable relative time base instabilities are introduced with respect to the luminance and the chrominance portions of the video signal.

Further, the modulation index, which controls the deviation of the oscillator in response to the luminance signal, must be limited, resulting in a poor signal-to-noise ratio. Other disadvantages of the above-mentioned prior-art recorder/reproducer include its relatively low resolution and poor transient response.

Means for improving the performance of the above-mentioned prior-art recorder/reproducer are disclosed in my U.S. Pat. No. 4,214,259. Of immediate importance, the video recording velocity is tripled. The threefold increase in the recording velocity is obtained by so modifying the diameter of the pulleys which couple the drum-driving motor to the upper drum, that the drum is caused to rotate at a rate in excess of 5400 r.p.m. Additionally, to insure proper synchronization of the rotation of the upper drum with the horizontal-synchronization portion of the video signal, the frequency of the signal developed by the tachometer is reduced by a factor of three.

The increased video-recording velocity permits the color-under modulation and demodulation circuitry to be replaced by relatively wider band width frequency modulation and demodulation circuitry of the type which is known as wide band direct. The wide band direct modulation circuitry develops a signal suitable for recordation by the scanner upon the tape by modulating the frequency of a relatively higher-frequency oscillator responsive to the amplitude of the video signal, including both the luminance and chrominance portion thereof. The new circuitry permits video signals to be recorded/reproduced so as to meet broadcast quality standards.

It is important to note that when the rotational rate of the upper drum is increased, the drum and associate recording heads rotate at a rate which no longer permits time for each of the drum-carried recording/reproducing heads to record a complete field of the encoded video signal upon a single respective video track of the tape. Rather, each field of the encoded signal is divided, segmented, into portions each of which is recorded upon a respective one of several successive video tracks. Thus, for a threefold increase in the drum rotational rate, each field of the encoded video signal is segmented into three portions including a first portion that generally represents the upper third of the image and which is recorded upon one video track, a second portion that represents the middle third of the image and which is recorded upon the next track and a third, lower, portion which is recorded upon the following track.

Unmodified, the above-mentioned prior-art recorder/reproducer may be operated in a slow-motion mode simply by suitably reducing the rotational rate of the capstan. For example, decreasing the rotational rate of the capstan by a factor of four, causes the signal recorded upon each of the video tracks to be reproduced four times. Because a full field of the video signal is recorded upon each track, each field of the video signal is repeated four times producing a slow-motion effect.

Unfortunately, special problems are associated with the slow-motion reproduction of video tapes recorded in the segmented helical-scan format. Reducing the rotational rate of the capstan of a helical-scan recorder/reproducer modified for segmented operation causes segmented portions, rather than full fields, to be multiply reproduced. In other words, when the rotational rate of the capstan is reduced by a factor of four, for example, a field of the reproduced video signal may contain only the upper portion of the image repeated in the top, middle and lower positions. The next field may contain a top and two middle portions, and the following field will contain two middle and one lower portion and so on.

SUMMARY OF THE PRESENT INVENTION

It is therefore an object of the present invention to provide a means by which video tapes recorded in a segmented helical-scan format may be reproduced so as to produce a slow-motion effect.

Another object of the present invention is to provide an economical means by which slow-motion reproduction capability may be added to inexpensive helical scan recorders/reproducers which are modified to meet broadcast quality standards.

Briefly, the preferred embodiment of the present invention includes a scanner and the combination of a capstan and pinch roller, the combination for drawing a length of video recording tape around the scanner. The scanner has a fixed lower drum for guiding the tape such that the tape partially wraps the scanner in helical fashion and a rotatable upper drum that carries a pair of heads for reproducing signals previously recorded upon the tape in a segmented helical-scan format. A motor supplies rotational drive to the upper drum the rotational rate of which is suitably reduced by a drum-servo loop. The capstan is driven by a capstan servo loop having a capstan motor for rotating the capstan and a capstan servo block, the loop for controlling the rotational rate of the motor to rotate the capstan at both the normal and at a reduced, slow-motion, rate. The invention also includes an FM modulator for developing a reproduced video signal by frequency demodulating signals reproduced by the drum-carried heads and a video-switching apparatus.

The capstan-servo block includes the combination of circuitry for amplifying and conditioning a signal developed by a capstan tachometer and a servo-velocity circuit, the combination for developing a capstan velocity-error signal, a servo-phase circuit for comparing the frequency of a signal reproduced from a control track of the tape with the frequency of a reference signal to develop a position-error signal and capstan-motor-driving circuitry for causing the capstan to rotate at a rate that minimizes the velocity and position-error signals. Additionally, the capstan-servo block includes a frequency multiplier, for multiplying the frequency of the tachometer signal, a frequency divider for dividing the frequency of the reference signal, and a pair of switches, the combination permitting the capstan to be operated at a slow-motion rate. For normal operation, one switch couples the tachometer signal to the servo-velocity circuit, and the other switch couples the reference signal to the servo-phase circuit. For slow-motion operation, the switches substitute the multiplied-tachometer signal and the frequency-divided reference signal for the tachometer and reference signals, respectively.

The video switching apparatus includes a switching signal generator for developing suitable timing signals from a head switching signal developed by the FM demodulator, a keyed clamping circuit for selectively DC restoring the reproduced video signal and an analog switch for suitably combining proper segments of the DC-restored signal with a black-level video signal so as to develop a slow-motion signal.

A frame synchronizer for selectively storing portions of the slow-motion signal is included in one embodiment to reduce flicker.

The ability to reproduce signals previously recorded upon a video tape in a segmented helical-scan format so as to provide a slow-motion effect is a material advantage of the present invention.

Another material advantage of the present invention is the ability it affords to employ an economical recorder/reproducer modified to meet broadcast quality standards to slow-motion reproduce video tapes previously recorded in a helical-scan format.

Still another advantage of the present invention is the ability it affords to slow-motion reproduce tapes recorded in segmented helical-scan format with minimal flocker.

These and other objects and advantages of the present invention will no doubt become apparent to those skilled in the art after having read the following detailed description of the preferred embodiment which is illustrated in the several figures of the drawing.

IN THE DRAWING

FIG. 2 is a schematic diagram further illustrating the frequency multiplier with its associated switch both being shown in FIG. 1;

FIG. 3 is a schematic diagram further illustrating the frequency divider with its associated switch shown in FIG. 1; and FIG. 4 is a schematic diagram further illustrating the video-switching apparatus shown in FIG. 1.

DETAILED DESCRIPTION OF THE PREFERRED EMBODIMENT

Figure 1:
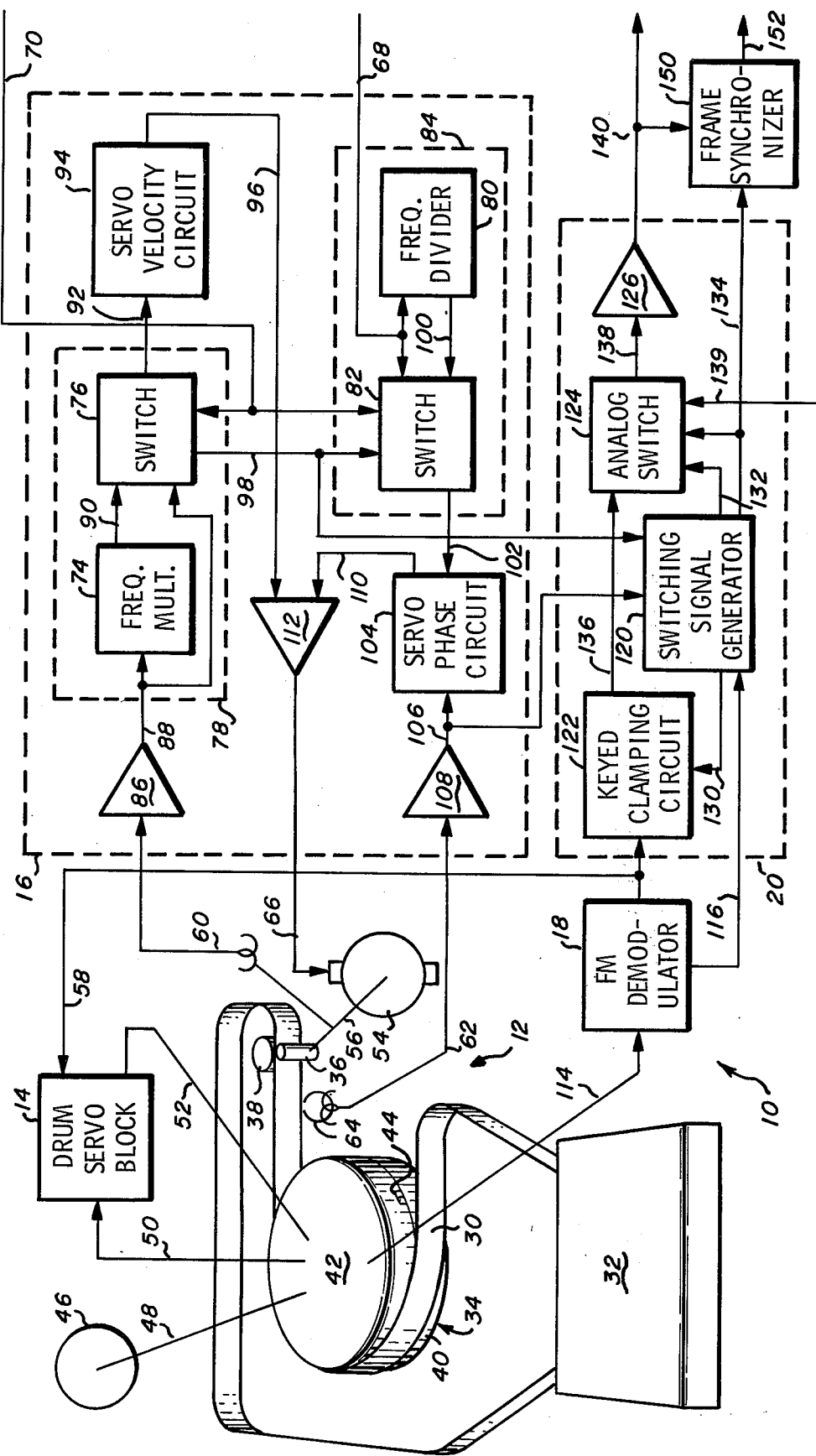
FIG. 1 is a combined perspective and block diagram illustrating the principal components of a slow-motion video-tape reproducer in accordance with the present invention.

The preferred embodiment of a video-tape reproducer suitable for the slow-motion reproduction of video tapes previously recorded in segmented helical-scan format is illustrated in FIG. 1 generally designated by the number 10. In addition to a number of generally mechanical tape-transport components, collectively designated 12, the principal components of reproducer 10 include a drum-servo block 14, a capstan-servo block 16, an FM demodulator 18 and a video-switching apparatus 20.

The tape-transport components, that are collectively designated 12, provide a means for transporting a length of magnetic recording tape, such as the length of three quarter inch wide tape illustrated at 30 partially withdrawn from an associated video cassette 32, to access signals previously recorded thereon. More specifically, tape 30 is drawn from cassette 32 and around a scanner 34 by the combination of a capstan 36 and a pinch roller 38 before being returned to the cassette.

Scanner 34 is comprised of a pair of cylindrically shaped drums including a lower drum 40 and an upper drum 42. Drum 40 is rigidly mounted and serves to guide tape 30 such that the tape partially wraps scanner 34 in helical fashion. Drum 42 serves to carry a pair of diametrically-opposed reproducing heads 44, only one of which is visible in the drawing. Heads 44 are suitably, peripherally, mounted such that as drum 42 is rotated, each of the heads accesses a video track recorded upon track 30.

Rotational drive for drum 42 is obtained from a drum motor 46. Motor 46 is so coupled to drum 42, as by pulleys and a belt, that the drum is caused to rotate at a rate consistent with the segmented format in which tape 30 has been previously recorded. In the preferred embodiment, motor 46 is so coupled to drum 42 as to rotate the drum at a rate in excess of 5400 r.p.m., three times the normal, nonsegmented rate. The coupling between motor 46 and drum 42 is represented in the drawing by a line 48.

Control of the rotational rate of drum 42 is affectuated by a servo loop employing servo block 14. Block 14 is driven by a signal developed by a drum-monitoring tachometer. The tachometer signal, which has a frequency proportional to the rotational rate of the drum, is coupled to block 14 by a line 50. Magnetically coupled to drum 42 is a drum-slowing magnetic brake, driven by a signal developed by block 14 and coupled to the brake by a line 52. For clarity, neither the tachometer nor the brake is shown.

Drum servo block 14 includes circuitry for developing an error signal by comparing a reduced multiple of the frequency of the tachometer signal developed on line 50 with the frequency of the vertical-synchronization portion of the reproduced video signal developed by FM modulator 18 on a line 58. From the error signal the magnetic-brake-driving signal is developed on line 52 such that the rotational rate of drum 42 is synchronized with the reproduced-video signal developed on line 58.

Capstan 36 is driven by a capstan motor 54, illustrated coupled to the capstan by a line 56. The rotational rate of motor 54, and thus of capstan 36, is controlled by another servo loop including, in this case, capstan-servo block 16. Block 16 is driven by a signal developed by a capstan tachometer 59. The tachometer develops a signal on a line 60 which is connected to block 16, the signal having a frequency that is proportional to the rotational rate of motor 54. Also connected to block 16 is a signal developed on a line 62 by a suitably disposed control-track-reproducing head 64, the signal representing the 30 hertz signal previously recorded upon the control track of tape 30. A motor-driving signal developed by servo block 16 is coupled to motor 54 by a line 66.

The tachometer signal developed on line 66 is employed by capstan-servo block 16 to develop a velocity-error signal. In addition, block 16 develops a position, or phase, error signal by comparing the frequency of the reproduced signal developed on line 62 with that of an external vertical-reference signal developed on a line 68. From the two error signals, block 16 develops the motor driving signal on line 66 so as to maintain the rotational rate of motor 54, and thus capstan 36, at one of two selected rates each synchronized with tape 30. Normally, the capstan is driven at such a rate that each of the video tracks on tape 30 is accessed in succession but once. Responsive to a slow-motion command signal developed on a line 70, block 16 develops a signal on line 66 which causes motor 54 to drive capstan 36 at such a reduced rate that each of the video tracks is accessed, in the preferred embodiment, four times in succession.

More specifically, as means for suitably reducing the rotational rate of capstan 36 so as to permit the slow-motion reproduction of tape 30, capstan servo block 16 includes the combination of a frequency multiplier 74 and an associated switch 76, collectively designated 78, and the combination of a frequency divider 80 and an associated switch 82, collectively designated 84. Multiplier 74 and divider 80 compensate for the reduced frequency of the tachometer signal developed on line 60 and the control track reproduced signal developed on line 62, respectively, to lock the loop at the reduced, slow-motion rate. After being amplified and conditioned by circuitry represented by an amplifier 86, the tachometer signal developed on line 60 is coupled to an input of frequency multiplier 74, by a line 88. From the conditioned tachometer signal, frequency multiplier 74 develops a signal on a line 90, which, in the preferred embodiment, has a frequency four times that of the tachometer signal. Selection of the conditioned tachometer signal for normal operation or the multiplied tachometer signal for slow-motion operation is effectuated by switch 76. Switch 76 has a control input connected to line 70 for receiving the slow-motion-command signal and for selecting the normal or the multiplied tachometer signal each developed at a respective one of two switch inputs connected, respectively, to lines 88 and 90. The selected input is coupled by the switch to a switch output that is connected to a line 92. The normal or multiplied tachometer signal developed on line 92 drives a servo velocity circuit 94 which develops the capstan velocity-error signal on a line 96. Additionally, switch 76 develops an inverted slow-motion-control signal on a line 98 for use by switch 82 and video-switching apparatus 20.

For slow-motion operation, the external vertical-reference signal developed on line 68 is also suitably conditioned before being coupled to the phase-error-signal-generating portion of capstan-servo block 16. From a vertical-reference signal developed on line 68, frequency divider 80 develops a signal on a line 100 having a frequency, in the preferred embodiment, one fourth that of the vertical-reference signal. The vertical-reference signal developed on line 68 or the divided reference signal developed on line 100 is selectively coupled to a line 102 by a switch 82 responsive to the slow-motion control signal developed on line 70 and its inverse developed on line 98 to provide normal or slow motion operation, respectively, of capstan 36. The switched signal developed on line 102 drives one input of a servo-phase circuit 104 having another input connected to a line 106 for receiving the control-track-reproduced signal developed on line 62 after it is amplified and conditioned by circuitry represented by an amplifier 108. From these two signals, servo phase circuit 104 develops a phase-error signal on a line 110. Both the velocity-error signal developed on line 96 and the phase-error signal developed on line 110 are used by circuitry represented by an amplifier 112 to develop the motor driving signal on line 66.

FM demodulator 18 frequency demodulates signals reproduced from the video tracks of tape 30 by heads 44 and coupled to the demodulator, as indicated by a line 114, to develop on line 58 a normal reproduced-video signal, in the normal mode. In the slow-motion mode, in the preferred embodiment, demodulator 18 develops a signal on line 58 in which each of the three segments that comprise a normal reproduced video signal is repeated four times in succession. Additionally, a one-of-two head-switching signal employed by demodulator 18 is coupled to a line 116.

Video-switching apparatus 20 develops a slow-motion reproduced video signal by combining suitable segments of the reproduced-video signal developed on line 58 with a black-level-video signal. More specifically, apparatus 20 includes a switching-signal generator 120, a keyed-clamping circuit 122, an analog switch 124, and a video amplifier 126. Switching signal generator 120 develops a keyed-clamping-circuit-enabling signal on line 130, and a pair of switch-state-controlling signals on respective ones of a pair of lines 132 and 134. Controlled by the inverted, slow-motion-command signal developed on line 98, the signals are continuously developed on lines 130, 132 and 134, in the normal mode, and are developed in response to the head switching signal developed on line 116 and the conditioned control-track reproduced signal developed on line 106, otherwise. The reproduced video signal developed on line 58 is clamped at times controlled by the enabling signal developed on line 130, before being coupled to a line 136 by keyed-clamping circuit 122. Switch 124 couples the reproduced signal developed on line 136 to a line 138, in the normal mode. In the slow-motion mode, responsive to the state-controlling signals developed on lines 132 and 134, switch 124 suitably combines proper ones of the segments of the reproduced video signal developed on line 136 with a black-reference-level video signal developed on a line 139 to develop a slow-motion signal on line 138.

More specifically, as previously indicated, each field of the video signal is recorded on tape 30 as frequency modulation of a carrier signal which is divided into three time segments each recorded upon a separate video track. When reproduced in the slow-motion mode, each of the segments is repeated four times. Responsive to the signals developed on lines 132 and 134, switch 124 selects a one of each group of four repeated segments which is in the proper time, or field, position for coupling to line 138. During other times, when a repeated segment is in an improper field position, switch 124 substitutes the black-level video signal therefor. Thus, when viewed on a monitor, the displayed segments will be in the correct position; however, the refresh rate will be reduced by a factor of three causing a degree of flicker. The black-level-video signal insures that nothing is displayed during the times that a repeated segment would otherwise be displayed in the wrong part of the field. Finally, the reproduced signal is coupled from line 138 to a line 140 by video amplifier 126.

In an alternative embodiment, a frame synchronizer 150 is also included. Synchronizer 150 includes circuitry, gated by the switch gate controlling signal developed on line 134, for storing each of the selected segments of the reproduced signal developed on line 140 to develop therefrom a video signal on a line 152. By storing only the selected segments to develop stored frames which are multiply reproduced to develop the video signal on line 152, the signal is developed on line 152 without the flicker associated with the signal developed on line 140.

Thus, where a video signal has previously been recorded upon a length of video recording tape by a U-Matic video tape recorder of the type which is modified to include wideband-direct circuitry for modulating the frequency of an oscillator responsive to the amplitude of a video signal to develop a modulated signal and modified to divide each field of the modulated signal into a number of segments each for recordation upon a respective one of a number of video tracks on the tape, the method of slow-motion reproducing the tape to develop a signal representing, in slow motion, the video signal may be seen to comprise the following steps. The first step includes transporting the tape partially around, in helical fashion, a scanner, such as tape 30 is drawn around scanner 34 by the combination of capstan 36 and pinch roller 38. For slow-motion reproduction the rate at which the tape is transported should be an integer submultiple of the rate employed when the tape was recorded. Capstan 36 is driven at such a rate in the slow-motion mode, by motor 54 responsive to the control loop which includes control track head 64, tachometer 60 and capstan-servo block 16.

Further, the method of reproducing tape 30 includes the step of scanning the video tracks of the tape, as with heads 44, to reproduce each one of the segments of the modulated signal recorded upon a respective one of the tracks of tape 30 which is transported around scanner 34. Because of the reduced rate at which tape 30 is transported, each segment of the modulated signal is reproduced a number of times in succession. Also included is the step of demodulating each one of the segments of the modulated signal which is reproduced by scanner 30 to develop a corresponding segment of a demodulated signal as is developed by FM demodulator 18. Finally, the method includes the step of combining a one of each of the several segments of the demodulated signal which correspond to a unique one of the tracks with a black-level video signal to develop the slow-motion video signal. Each selected segment should be one which is in the proper field position as is designated by generator 120 for combining in switch 124.

For a further description of the tape transport components, which are collectively designated 12, drum servo block 14, FM demodulator 18 and, except for frequency multiplier 74, switch 76, frequency divider 80 and switch 82, the components of capstan servo block 14, the reader is referred to the appropriate Sony technical manual in conjunction with my U.S. Pat. No. 4,214,259. It should be noted that lines designated 70, 88, 92, 102 and 106 shown in FIG. 1 are connected to terminals designated CS8-CN3-10, CS8-IC15-1, CS8-IC11-4, CS8-IC1-7 and CS8-TP14 by the Sony Corporation.

Further illustrated in FIG. 2, multiplier 74 is shown to include the series combination of a frequency-doubling circuit 200 driving a constant-duty-cycle one-shot multivibrator circuit 202, the combination driving a similar combination of a frequency-doubling circuit 204 and a one-shot multivibrator circuit 206. Frequency-doubling circuit 200 includes a pair of exclusive OR gates 208 and 210. Gate 208 is connected in an inverter configuration having an input connected to line 88, another input coupled to a high-logic-level potential by a line 212 and an output coupled by the combination of a line 214, a time delay network 216 and a line 218 to an input of gate 210. Network 216 has a time-delay resistor 220 connected between lines 214 and 218 and a time-delay capacitor 222 connected between line 218 and circuit ground. Gate 210 has another input which is connected to line 88 and an output connected to a line 224. In the preferred embodiment, gates 208 and 210 each form a portion of a device of the type which is commonly designated in the art 7486.

Since gate 208 functions as an inverter, the two inputs of gate 210 are normally maintained at different logic level potentials. As a result, gate 210 develops a signal on line 224 normally having a high logic level. However, following each transition of the signal developed on line 88, for a brief period established by network 216, the signal levels developed at the two inputs of gate 210 are similar. Responsive thereto, gate 210 develops a narrow, negative-going pulse in the signal on line 224.

The active components of multivibrator circuit 202 include a timing device 230, an operational amplifier 232 and a PNP transistor 234. Device 230 has a triggering input connected to line 224, a timing input connected to a line 236, which is coupled to circuit ground by a timing capacitor, and an output connected to a line 240, that is coupled to a positive power supply potential by a pull-up resistor 42.

Amplifier 232 is connected so as to function as an integrator, the amplifier having a non-inverting input coupled to line 240 by a time-constant-setting resistor 244 and by an integrating capacitor 246 to a line 248. Further, amplifier 232 has a non-inverting input coupled by a line 250 to the wiper of a reference-potential-setting potentiometer 252 which has distal ends one connected to a positive power supply potential and the other to circuit ground. Finally, amplifier 232 has an output connected to line 248. Transistor 234 is connected as a current source having a base coupled to line 248 by a base current limiting resistor 254, an emitter coupled to a positive-power-supply potential by a line 256 and a collector connected to line 236. In the preferred embodiment, device 230 and amplifier 232 each form a portion of a respective one of a pair of devices which are commonly designated in the art 556 and 1458.

Transistor 234 operates as a source of capacitor 238 charging current of a magnitude which is controlled by the potential developed on line 248. Timing device 230 is bistable. In a first state, device 230 clamps the potential developed by transistor 234 across capacitor 248 to a first level. When triggered by each of the series of pulses of the signal developed on line 224, device 230 changes to the other state in which it permits transistor 234 to charge capacitor 238 from the first, to a second, relatively higher, potential. Each time the higher potential is reached, device 230 reverts back to the first state, discharging capacitor 238 to the first potential. Thus, responsive to the series of pulses of the signal developed on line 224, device 230 develops a signal on line 240 having a series of pulses each with a width which is controlled by transistor 234.

Operating as an integrator, amplifier 232 develops the transistor 234 controlling potential on line 248 by time averaging the level of the signal developed on line 240 relative that developed by potentiometer 252 on line 250. Control of transistor 234, exercised by amplifier 232, provides closed-loop feedback such that when potentiometer 252 is suitably adjusted, device 230 develops the pulses in the signal on line 240 so as to have a constant, 50%, duty cycle.

Circuit 204 includes a pair of exclusive-OR gates 260 and 262, gate 260 being connected as an inverter with an input connected to line 240, another input connected to a high-logic-level potential and an output. In addition to an input connected to line 240, gate 262 has another input coupled to the output of gate 260 by a time-delay resistor 264 and coupled to circuit ground by a time-delay capacitor 266. Gate 262 has an output which is connected to a line 268. In a fashion similar to circuit 200, circuit 204 responds to each transistion of the series of pulses of the signal developed on line 240 to develop on line 268 a signal having a series of narrow pulses at twice the frequency thereof.

Multivibrator circuit 206 includes a delay device 270, an operational amplifier 272 and a PNP transistor 274. Delay device 270 has a triggering input connected to line 268, a timing input connector to a line 276, that is coupled to circuit ground by a timing capacitor 278, and an output connected to line 90. Amplifier 272 has an inverting input coupled to line 90 by a time-constant-setting resistor 280 and coupled to a line 282 by an integrating capacitor 284. Additionally, amplifier 272 has a non-inverting input connected to the wiper of a reference-potential-setting potentiometer 286 which has a pair of distal ends, one connected to a positive-power-supply potential and the other to circuit ground. Finally, amplifier 272 has an output connected to line 282. Transistor 274 has a base coupled to line 282 by a base-current-limiting resistor 288, an emitter connected to a positive-power-supply potential and a collector connected to line 276. A pull-up resistor 290 is connected between a positive-power-supply potential and line 90. Much in the fashion of multivibrator 202, responsive to the series of pulses of the signal developed on line 268, multivibrator 206 develops a signal having a series of pulses on line 90 having a constant, 50%, duty cycle.

Switch 76 is shown to include, as active components, a pair of two-input NAND gates 300 and 302, a two-input NOR gate 304 and an inverter 306. The inputs of gate 300 are connected to the respective ones of lines 90 and 98. Lines 70 and 78 are connected to the respective ones of the inputs of gate 302. The output of gate 300 and that of gate 302 are connected to the respective inputs of gate 304 by a line 310 and a line 312, respectively. The output of gate 304 is connected to line 92. Inverter 306 is connected from line 70 to line 98. Finally, a pull-up resistor 316 is connected between a high-logic-level potential and line 70.

Inverter 306 inverts and couples to line 98 the active-low slow-motion-command signal developed on line 70. Responsive to the active state of the slow-motion-command signal developed on line 70, a high-logic-level signal is developed on line 98 and gates 300 and 304 coupled signals developed on line 90 to line 92. When the slow-motion-command signal is in the inactive state, gates 302 and 304 coupled the signal developed on line 88 to line 92.

Frequency divider 80 is shown in FIG. 3 to include a pair of cascaded J-K flip-flops 350 and 352 each having a J and a K input which are connected to a high-logic-level potential. Flip-flop 350 has a clocking input connected to line 68 and a normal, or Q, output coupled to the clocking input of flip-flop 352 by a line 356. Flip-flop 352 has a normal output connected to line 100. In the preferred embodiment, flip-flops 350 and 352 each form a portion of a device of the type which is commonly designated in the art 74107.

Flip-flop 350 counts the pulses of the signal developed on line 68 to develop a signal on line 356 having a frequency one half that of the line 68 driving signal. In a similar fashion, the frequency of the signal developed on line 356 is further divided, by flip-flop 352, to develop a signal on line 100 having a frequency one fourth that of the signal developed on line 68.

Switch 82, which resembles switch 76, includes a pair of two-input NAND gates 370 and 372 and a NOR gate 374. The inputs of gate 370 are connected to respective ones of lines 98 and 100, and the inputs of gate 372 are connected to respective ones of lines 68 and 70. The output of gate 370 is coupled to an input of gate 374 by a line 376, and the output of gate 372 is coupled by a line 378 to the other input of gate 374. The output of gate 374 is connected to line 102.

Responsive to the high-logic-level signal developed on line 98 in the slow-motion mode, gates 370 and 374 couple signals developed on line 100 to line 102. Alternately, in the normal mode, responsive to the high-logic-level signal developed on line 70, the signal developed on line 68 is coupled to line 102 by gates 372 and 374.

Turning now to FIG. 4, the principal components of switching-signal generator 120 include a one-shot multivibrator 400, a differentiating network 402, a J-K flip-flop 406, a switching circuit 408, a pair of one-shot multivibrators 410 and 412 and a 2-input NAND gate 414. Multivibrator 400 and network 402 are connected as as to develop from the control-track-reproduced signal developed on line 106 a signal having a series of pulses each for resetting, if necessary, flip-flop 406 to properly synchronize the flip-flop. More specifically, multivibrator 400 has an edge-triggered input connected to line 106 for receiving, as a triggering signal, negative going transitions of the conditioned-control-track signal developed thereon. Responsive thereto, multivibrator 400 develops a signal having a series of high-logic-level pulses at an output which is connected to line 420. Further, multivibrator 400 has a timing input coupled by a time-constant-capacitor 422 to another timing input of the multivibrator which is coupled by a time-constant resistor 424 to a high-logic-level potential, the combination for establishing the width of each of the pulses.

Pulses developed on line 420 are differentiated by circuit 402 which includes a DC-blocking capacitor 426 connected between line 420 and a node 428, a first voltage-divider resistor 430 connected between a high-logic-level potential and node 428 and another voltage-divider resistor 432 connected between node 438 and circuit ground. The output of differentiating network 402 is coupled to a reset input of flip-flop 406 by means of a pair of pulse-shaping inverters 436 and 438 which are series connected from node 428 to a line 440 that is connected to the reset input of the flip-flop. Additionally, flip-flop 406 has a clocking input coupled to line 116 by another pair of signal shaping inverters, that include an inverter 442 and an inverter 444, which are series connected between line 116 and a line 446 that is connected to the clocking input of the flip-flop. Further flip-flop 406 has a J and a K input both of which are coupled by a line 448 to a high-logic-level potential. Flip-flop 406 divides by two the frequency of the head select signal developed on line 116 to develop a gating signal at an output that is connected to a line 450.

Switching circuit 408 includes a pair of two-input NAND gates 454 and 456. Gate 454 has an input connected to line 446 and another input connected to a line 450 for gating the one-of-two head selecting signal with the frequency-divided head-select signal to develop a one-of-four signal at an output that is coupled to an input of gate 456 by a line 462. Gate 456 has another input which is connected to line 98 for gating with the one-of-four signal the inverted slow-motion command signal to selectively couple the one-of-four signal to a gate output that is coupled by a line 464 and an inverter 466 to line 132. Another inverter 468 is connected between lines 132 and 134 to further invert the one-of-four signal.

Multivibrators 410 and 412 are connected in cascade, to develop from each pulse of the one-of-four signal a signal having a suitably delayed pulse of suitable width for enabling keyed-clamping circuit 122. More specifically, multiplier 410 has a triggering input connected to line 134 and a complementary output coupled by a line 470 to a triggering input of multiplier 412 which has a complementary output connected to a line 472. Further, multivibrator 410 has a timing input coupled by a time-constant capacitor 474 to another timing input of the multivibrator which is coupled by a time-constant resistor 476 to a high-logic-level-potential, the combination for establishing the width of each of the pulses developed by the multivibrator which determine the delay between a pulse of the one-of-four signal and the corresponding pulse of the keyed-clamping-circuit-enabling signal. Finally, multivibrator 412 has a pair of timing inputs one being coupled to the other by a time-constant-capacitor 478 and to a high-logic-level potential by a time-constant resistor 480, this combination for controlling the width of the pulses of the keyed-clamping-circuit-enabling signal. Gate 414 has an input connected to line 472, another input connected to line 98 and an output connected to line 130. By gating the pulse developed on line 472 with the inverted slow-motion signal developed on line 98, gate 414 develops the keyed-clamping-circuit-enabling signal on line 130 as a series of pulses in the slow-motion mode and as a high-logic level otherwise. In the preferred embodiment multiplier 400, flip-flop 406 and multipliers 410 and 412 are integrated in devices of the type which are known in the art as 74121, 74107 and 74221, respectively.

Keyed-clamping circuit 122 includes as active components a pair of PNP transistors 500 and 502 and a pair of N-channel junction field-effect transistors, JFETs, 504 and 506. Transistor 500 has a base connected to a line 508, which is coupled to line 130 by a base-current-limiting resistor 510 and to a high-logic-level potential by a pull-up resistor 512, an emitter connected to a high-logic-level potential and an emitter coupled to a negative power supply potential by the series combination of a line 516, a first voltage divider resistor 518 and a second voltage divider resistor 520.

Transistor 502 has a base connected to the juncture of resistors 516 and 518 at a node 524, a grounded emitter and a collector connected to a node 526. JFET 504 has a gate connected to a node 530, which is coupled to line 58 by a clamping capacitor 532 and to node 526 by a clamping diode 534. Additionally, JFET 504 has a source coupled to line 116 by an off-set-adjusting variable resistor 536 and a drain connected to a positive-power-supply potential. JFET 506 has a gate connected to a negative-power-supply potential, a source connected to a negative power supply potential by a bias-current-setting resistor 538 and a drain connected to line 116. Node 526 is coupled to a negative-power-supply potential by a transistor-load resistor 539. Analog switch 124 includes a switching device 550 having a pair of control inputs connected, respectively, to lines 134 and 132, and CMOS FET devices which function as a pair of electronically controlled SPST contacts, the first being connected, respectively, between lines 116 and 138 and the second being connected, respectively, between lines 139 and 138. In the preferred embodiment, device 550 is of the type which is designated DG300 by the Siliconix Corporation.

The active components of video amplifier 126 include three NPN transistors 560, 562 and 564. Transistors 560 and 562 are connected in a differential-amplifier configuration. More specifically, transistor 560 has a base connected to line 138, which is coupled to circuit ground by a base-biasing resistor 568, an emitter connected to a node 570, which is coupled to circuit ground by an emitter-biasing resistor 572, and a collector connected to a positive-power-supply potential. Transistor 502 has a base connected to a node 574, an emitter connected to node 570 and a collector connected to a node 576 which is coupled to a positive-power-supply potential by a load resistor 578.

Transistor 564 has a base connected to node 576, an emitter connected to a node 582 and a collector connected to a positive-power-supply potential. Node 582 is coupled to a line 584 by the parallel combination of a zener diode 586 and a zener-noise-bypassing capacitor 588, the combination for establishing a potential offset between the node and the line. Line 584 is coupled to line 140 by a source-impedance-establishing resistor 590, to a negative power supply potential by an emitter-biasing resistor 592 and to transistor 562 by a feedback network 593. Network 593 includes a series combination of a first voltage-divider resistor 593 and a second, variable, voltage-divider resistor 596 connected between lines 584 and node 574 and a third voltage-divider resistor 598 connected between node 574 and circuit ground.

Operationally, flip-flop 406 and gate 454 develop the one-in-four signal on line 462 from the one-in-two head-select signal developed on line 116. More specifically, the head-select signal is coupled by inverters 442 and 444 from line 116 to line 446 where it clocks flip-flop 406 that drives gate 454. Flip-flop 406 divides by two the frequency of the head-select signal to develop a gating signal on line 450 which causes gate 454 to couple, inverted, every other one of the pulses of the head-select signal from line 446 to line 462. Gate 462 gates the one-in-four signal developed on line 462 with the inverted, slow-motion command signal developed on line 94 to develop the switch-state-controlling signal on lines 132 and 134. In the slow-motion mode, the one-in-four signal is coupled to line 134 and is inverse to line 132. In the normal mode, a high-logic-level-signal is developed on line 134 and a low-logic-level-signal on line 132.

Because of the ambiguity of the state of flip-flop 406 with respect to the head-select signal developed on line 116, a reset signal is developed by multivibrator 400 and differentiating network 402 on line 440 from the conditioned control-track signal developed on line 106. Once flip-flop 406 is reset, if necessary, to correct the phase thereof, the timing of the reset signal is such as to have no further effect on the flip-flop.

In the slow-motion mode, from the one-in-four signal developed on line 134, multivibrators 410 and 412 and gate 414 develop the clamp-enabling signal on line 130 in the form of a series of pulses. Triggered by each pulse of the one-in-four signal, multivibrator 410 develops on line 470 an inverted pulse having a width that establishes a delay interval. Responsive to each of the inverted pulses developed on line 470, multivibrator 412 develops a pulse on line 472. Gated by the inverted slow-motion signal developed on line 98, gate 414 inverts the pulses developed on line 472 to develop the keyed-clamping-circuit-enabling signal on line 130. In a normal mode, a low logic level signal is developed on line 98 causing gate 414 to develop a high logic level signal on line 130.

Responsive to an active state of the keyed-clamping-circuit-enabling signal developed on line 130, a high-logic-level, transistor 500 is biased off. As a result, resistor 520 biases transistor 502 into saturation developing a near circuit ground potential at node 526 to clamp the reproduced video signal developed on line 58. A low-logic-level signal developed on line 130 biases on transistor 500 which develops a potential at node 524 that biases transistor 502 off. As a result, resistor 539 develops a negative potential at node 526 that biases off diode 524. JFET 506 bias JFET 504 which couples to line 116 the clamped signal developed at node 530 while isolating therefrom the loading effects of analog switch 124.

When resistor 536 is suitably adjusted, JFET 504 introduces a negligible DC offset.

Analog switch 124 couples the clamped reproduced-video signal developed on line 116 to line 138, in the normal mode. In the slow-motion mode, responsive to the one-of-four switch-controlling signal developed on line 134 and its inverse developed on line 132, switch 124 suitably combines the clamped reproduced video signal developed on line 116 with the black-level-video signal developed on line 139 to develop the slow motion reproduced video signal on line 138. The video signal is amplified and coupled from line 138 to line 140 by video amplifier 126 which has a gain, in the preferred embodiment of three established by the feedback network comprised of resistors 594, 596 and 598.

It is contemplated that after having read the preceding disclosure certain alterations and modifications of the present invention will no doubt become apparent to those skilled in the art, it is therefore intended that the following claims be interpreted to cover all such alterations and modifications as fall within the true spirit and scope of the invention.

I claim:

1. A video tape reproducer for developing a video signal representing in slow motion a signal previously encoded and recorded upon a plurality of video tracks on a length of magnetic recording tape in a helical-scan format wherein each field of the encoded signal is divided into a plurality of segments each recorded upon a respective one of the tracks of the tape, the reproducer comprising in combination:
    scanner means including means for reproducing each one of the segments of the encoded signal which is recorded upon a corresponding one of the video tracks that is drawn past said scanner means;
    capstan means for drawing said tape past said scanner;
    means for rotating said capstan means at a rate wherein said one of said segments of said encoded signal is reproduced a plurality of times in succession;
    means for decoding said segments of said encoded signal which are reproduced by said scanner means to develop corresponding segments of a decoded signal; and
    switching means for developing the slow-motion signal by combining a one of each plurality of segments of said decoded signal which correspond to a unique one of said tracks with a black-level video signal.

2. A video tape reproducer for developing a video signal representing in slow motion that signal employed to frequency modulate an oscillator to develop a frequency modulated signal previously recorded upon a plurality of video tracks on a length of magnetic recording tape in a helical-scan format of the type employed by U-Matic recorders modified to divide each frame of the modulated signal into a plurality of segments each recorded upon a respective one of the tracks of the tape, the reproducer comprising in combination:
    scanner means including a drum having a pair of reproducing heads for reproducing each one of the segments of the modulated signal which is recorded upon a corresponding one of the video tracks that is drawn partially around said scanner means;
    capstan means for drawing said tape partially around said scanner means;
    means for rotating said capstan means at a rate wherein said one of said segments of said modulated signal is reproduced a plurality of times in succession;
    means for demodulating each one of said segments of said modulated signal which is reproduced by said scanner means to develop a corresponding segment of a demodulated signal; and
    switching means for developing the slow-motion video signal by combining a one of each plurality of segments of said demodulated signal which correspond to a unique one of said tracks with a black-level video signal.

3. A video tape reproducer as recited in claim 2 wherein said tape has a control track upon which a control signal has been previously recorded and wherein said capstan rotating means includes:
    means for developing a tachometer signal having a frequency proportional to the rotational rate of said capstan,
    means for multiplying the frequency of said tachometer signal by a predetermined integer to develop a multiplied signal,
    means for developing from said multiplied signal a signal representing the velocity error of said capstan,
    means for dividing the frequency of the vertical reference portion of an externally generated reference signal by said integer to develop a divided signal,
    means for reproducing said control track signal,
    means for comparing the signal reproduced by said reproducing means with said divided signal to develop a signal representing the phase error of said capstan,
    motor means for driving said capstan, and
    means for developing a motor means driving signal so as to minimize said velocity-error representing signal and said phase-error representing signal.

4. A video tape reproducer as recited in claim 3 wherein said multiplying means includes at least one frequency doubler having a circuit for doubling the frequency of a signal developed responsive to said tachometer signal to develop a frequency doubled signal and a monostable-multivibrator circuit triggered by said frequency doubled signal for developing a signal from which said multiplied signal is developed.

5. A video tape reproducer as recited in claim 4 wherein said frequency doubling circuit includes; means for developing a signal by inverting said signal developed responsive to said tachometer signal, means for developing a signal by delaying said signal developed by said inverting means, and exclusive-OR means for gating said signal developed by said delaying means with said signal developed responsive to said tachometer signal to develop said frequency doubled signal.

6. A video tape reproducer as recited in claim 4 wherein said monostable-multivibrator circuit includes:
    means for developing a reference potential of predetermined level,
    means for integrating the level of said signal from which said multiplied signal is developed relative the level of said reference signal to develop an integrated signal,
    means for developing a source of current of a level controlled by said integrated signal,
    capacitor means charged by said current source, and
    timing means having a first state in which said timing means discharges said capacitor means to a first predetermined potential level and a second state, said timing means for developing said signal from which said multiplied signal is developed so as to evidence the state of said timing means, said timing means being responsive to a transition of said frequency-doubled signal and operative to change from said first to said second state and being responsive to a second predetermined potential level being developed across said capacitor means and operative to change from said second to said first state.

7. A video tape reproducer as recited in claim 3 wherein said frequency dividing means includes at least one flip-flop triggered by a signal developed responsive to said reference signal for developing a signal from which said divided signal is developed.

8. A video tape reproducer as recited in claim 2 wherein said demodulating means further develops a head-switching signal timed to the reproduction by said scanner means of each of said segments of said modulated signal and wherein said switching means includes generator means for developing from said head-switching signal a signal delineating a one of said plurality of segments of said demodulated signal which is in a proper field position and a switch for combining those segments of a signal developed responsive to said demodulated signal which are designated by said segment-delineating signal with said black-level video signal to develop said slow-motion video signal.

9. A video tape reproducer as recited in claim 8 wherein said generator means includes flip-flop means for developing a signal by dividing the frequency of said head-switching signal and means for gating the signal developed by said flip-flop means with said head-switching signal to develop said segment-delineating signal.

10. A video tape reproducer as recited in claim 9 wherein said generator means further includes a cascaded pair of one-shot monostable multivibrators driven by said segment-delineating signal for developing an enabling signal having a series of pulses each delineating an interval within a corresponding one of the intervals delineated by said segment-delineating signal and means responsive to said enabling signal for clamping the level of said demodulated signal to develop said signal developed responsive to said demodulated signal.

11. A method for developing a video signal representing in slow motion that signal employed to frequency modulate an oscillator to develop a frequency-modulated signal previously recorded upon a plurality of video tracks on a length of magnetic recording tape in a helical-scan format of the type employed by U-Matic recorders modified to divide each frame of the modulated signal into a plurality of segments each recorded upon a respective one of the tracks of the tape, the method comprising in combination the steps of:

transporting the tape partially around a scanner having a drum carrying a pair of reproducing heads, said tape being transported at a rate which is a predetermined integer submultiple of the rate employed when said tape was previously recorded;

scanning the tracks of said tape with said pair of reproducing heads whereby each one of the segments of the modulated signal which is recorded upon a respective one of the tracks of said tape which is transported partially around said scanner is reproduced a plurality of times in succession, demodulating said segments of said modulated signal which are reproduced by said scanner means to develop corresponding segments of a demodulated signal; and combining a one of each plurality of segments of said demodulated signal which correspond to a unique one of said tracks with a black-level video signal to develop the slow-motion video signal.

* * * * *